US008869199B2

(12) United States Patent
Kim et al.

(10) Patent No.: US 8,869,199 B2
(45) Date of Patent: Oct. 21, 2014

(54) MEDIA CONTENT TRANSMISSION METHOD AND APPARATUS, AND RECEPTION METHOD AND APPARATUS FOR PROVIDING AUGMENTING MEDIA CONTENT USING GRAPHIC OBJECT

(71) Applicant: Electronics and Telecommunications Research Institute, Daejeon-si (KR)

(72) Inventors: Jung Hak Kim, Daejeon-si (KR); Soon Choul Kim, Daejeon-si (KR); Seung Chul Kim, Daejeon-si (KR); Bum Suk Choi, Daejeon-si (KR); Jeoung Lak Ha, Daejeon-si (KR); Young Ho Jeong, Daejeon-si (KR); Jin Woo Hong, Daejeon-si (KR)

(73) Assignee: Electronics and Telecommunications Research Institute, Daejeon-si (KR)

(*) Notice: Subject to any disclaimer, the term of this patent is extended or adjusted under 35 U.S.C. 154(b) by 0 days.

(21) Appl. No.: 13/672,091

(22) Filed: Nov. 8, 2012

(65) Prior Publication Data
US 2013/0117781 A1 May 9, 2013

(30) Foreign Application Priority Data
Nov. 8, 2011 (KR) .................. 10-2011-0115530

(51) Int. Cl.
H04N 7/10 (2006.01)
H04N 7/025 (2006.01)
G06F 3/00 (2006.01)
G06F 13/00 (2006.01)
H04N 5/445 (2011.01)
H04N 21/462 (2011.01)
H04N 21/84 (2011.01)
H04N 21/472 (2011.01)
H04N 21/81 (2011.01)
H04N 21/431 (2011.01)
H04N 21/458 (2011.01)

(52) U.S. Cl.
CPC ......... *H04N 21/431* (2013.01); *H04N 21/4622* (2013.01); *H04N 21/84* (2013.01); *H04N 21/47205* (2013.01); *H04N 21/8146* (2013.01); *H04N 21/458* (2013.01)
USPC .............................................. 725/37; 725/32

(58) Field of Classification Search
CPC ............ H04N 21/431; H04N 21/4312; H04N 21/4316; H04N 21/47205; H04N 21/8146; H04N 21/8153
USPC ............. 725/32, 37, 105, 109, 110, 114, 131, 725/134
See application file for complete search history.

(56) References Cited

U.S. PATENT DOCUMENTS

2007/0277092 A1* 11/2007 Basson et al. ................. 715/512
2008/0043156 A1* 2/2008 Heughebaert et al. ........ 348/734
2008/0168493 A1* 7/2008 Allen et al. ..................... 725/37

FOREIGN PATENT DOCUMENTS

KR          10-0706967          4/2007
KR          10-0747561          8/2007
KR         1020110049096        5/2011

*Primary Examiner* — John Schnurr
(74) *Attorney, Agent, or Firm* — Nelson Mullins Riley & Scarborough LLP

(57) ABSTRACT

Disclosed is a media content reception method for providing augmenting media contents using graphic objects, including: receiving metadata including information representing each event of any one of broadcast contents or moving picture contents, and any one of the broadcast contents or the moving picture contents and graphic object related information associated with events, the events including at least one of a specific scene, a specific situation, and a specific phenomenon of any one of the broadcast contents or the moving picture contents; analyzing the received metadata; designating the graphic objects to correspond to each event within any one of the broadcast contents or the moving picture contents based on the analyzed metadata; and displaying the designated graphic objects to meet each event at the time of playing any one of the broadcast contents or the moving picture contents.

18 Claims, 14 Drawing Sheets

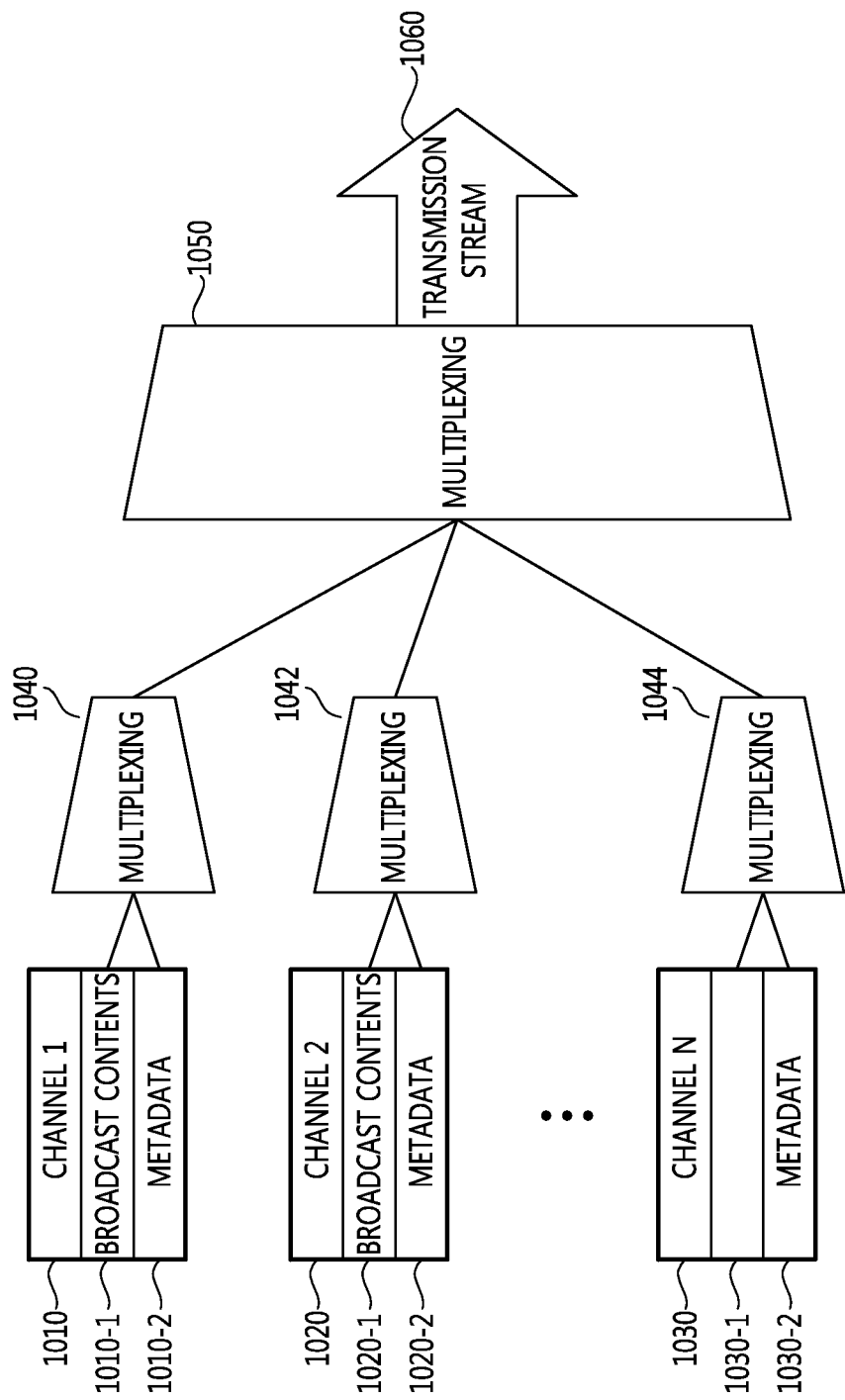

MEDIA CONTENT TRANSMISSION METHOD AND APPARATUS, AND RECEPTION METHOD AND APPARATUS FOR PROVIDING AUGMENTING MEDIA CONTENT USING GRAPHIC OBJECT

CROSS-REFERENCE TO RELATED APPLICATIONS

This application claims the benefit of priority of Korean Patent Application No. 10-2011-0115530 filed on Nov. 8, 2011, all of which are incorporated by reference in their entirety herein.

BACKGROUND OF THE INVENTION

1. Field of the Invention

The present invention relates to media content transmission method and apparatus and reception method and apparatus, and more particularly, to media content transmission method and apparatus and reception method and apparatus for providing augmenting media contents using graphic objects capable of helping viewers to understand broadcast or moving picture contents by providing more funny elements to broadcast or moving picture viewers.

2. Related Art

Recently, various types of media services have been provided through a broadcast and mobile network and the Internet. Among media services, augmented reality is a computer graphic mechanism that synthesizes virtual objects or information in a real environment to be seen like objects present in an original environment. With the recent appearance of smart phones, augmented reality services are provided in more various types.

An augmented reality technology may be referred to as a very attractive element in terms of a broadcast content provider. The broadcasting mainly makes profits through advertisements. For this reason, a virtual advertisement using the augmented reality may be a very attractive commercialization item. In case of broadcasting, augmented reality services are mainly provided through sports broadcasting. However, the augmented reality services may be an early stage so far and take a type of unilateral services provided by a broadcasting station.

The augmented reality services provided by the Internet content provider may be an early stage so far and take a unilateral type. An example of the augmented reality services may include products that pass around on web pages in a three-dimensional type, graphic objects that are popped up in an independent type at the time of accessing specific web sites, electronic books in a three-dimensional graphic type that are experimentally produced in recent, and the like.

The smart TV that becomes a hot topic in recent means a TV that can mount an operating system (OS) and an Internet access function in a digital TV to use real-time broadcasting using a terrestrial wave or a cable used from the past and various contents, such as video on demand (VOD), game, search, fusion, intelligent services, and the like, under a convenient user environment. One of the important features of the smart TV may be active content consumption of users. That is, this means that viewers do not merely view TV programs unilaterally sent out from a broadcasting station but may directly fill components of TV programs in his/her desired type.

Therefore, the augmented reality technology is applied to the smart TV, the viewers directly participate in TV programs at the time of applying the technology, and services to represent the augmented reality objects selected by the viewers while being overlaid on broadcast contents, the content consumption through the smart TV can be more activated.

In addition, services to represent the augmented reality objects selected by the users may be provided while being overlaid on various types of moving picture contents, even in a terminal that can view video media and use Internet service, such as a smart TV, a desk top personal computers (PC), a notebook PC, a tablet PC, a personal digital assistant (PDA), smart phones, and the like.

Korean Patent No. 10-0747561 that is the related art discloses a method for allowing a user to view any programs such as news, and the like, through audio and video of his/her own selected specific characters selected in a digital TV environment by allowing a server (broadcasting station) to transmit the specific characters and broadcasting information selected by the users as they are without being synthesized and synthesizing and displaying the specific characters and the broadcasting information in the corresponding digital TV. The related art continues to use the specific characters in the programs rather than to extract characters meeting specific events, which makes it difficult to perform lively directing depending on situations.

SUMMARY OF THE INVENTION

The present invention provides media content transmission method and apparatus and reception method and apparatus for providing augmenting media contents using graphic objects providing augmented reality services of a type in which behaviors such as emotion expressions, motion, and the like, are performed or any phenomenon is represented by displaying the graphic objects on a viewing screen according to situations or events of program contents or predetermined scenarios while a service user views broadcasting, video on demand (VOD), a digital video disc (DVD), or other similar type moving pictures.

In an aspect, a media content reception method for providing augmenting media contents using graphic objects is provided. The method includes: receiving metadata including information representing each event of any one of broadcast contents or moving picture contents and any one of the broadcast contents or the moving picture contents and graphic object related information associated with events, the events including at least one of a specific scene, a specific situation, and a specific phenomenon of any one of the broadcast contents or the moving picture contents; analyzing the received metadata; designating the graphic objects to correspond to each event within any one of the broadcast contents or the moving picture contents based on the analyzed metadata; and displaying the designated graphic objects to meet each event at the time of playing any one of the broadcast contents or the moving picture contents.

The receiving may include receiving the metadata by accessing at least one of a content provider server providing any one of the broadcast contents or the moving picture contents, or a metadata providing server providing the metadata.

The media content reception method may further include: inputting the graphic objects from at least any one of a user interface and an external apparatus, wherein when the graphic objects are input from the external apparatus, the graphic objects may be input through at least any one of a content provider server or an Internet site.

The graphic objects may be displayed together with a predetermined message, wherein the message may be at least one of contents describing events within any one of the broadcast contents or the moving picture contents or advertisement related contents.

The media content reception method may further include: providing a user interface adjusting the graphic objects.

The playing may include any one of adjusting a size, a type, and an output position of the graphic objects based on walking information of a camera used to produce any one of the broadcast contents or the moving picture contents, or adjusting color and brightness of the graphic objects based on output color or brightness information of any one of the broadcast contents or the moving picture contents.

The graphic objects may include advertisement related information.

In another aspect, a media content reception apparatus for providing augmenting media contents using graphic objects is provided. The media content reception apparatus includes: a receiving unit configured to receive metadata including information representing each event of any one of broadcast contents or moving picture contents and any one of the broadcast contents or the moving picture contents and graphic object related information associated with events, the events including at least one of a specific scene, a specific situation, and a specific phenomenon of any one of the broadcast contents or the moving picture contents; a metadata analyzing unit configured to analyze the metadata; a designating unit configured to designate the graphic objects to correspond to each event within any one of the broadcast contents or the moving picture contents based on the analyzed metadata; and a display unit configured to play the designated graphic objects to meet the events at the time of playing any one of the broadcast contents or the moving picture contents.

The receiving unit may receive the metadata by accessing at least one of a content provider server providing any one of the broadcast contents or the moving picture contents and a metadata providing server providing the metadata.

The media content reception apparatus may further include: an input unit configured to input the graphic objects from at least any one of a user interface and an external apparatus, wherein when the input unit inputs the graphic objects from the external apparatus, the graphic objects may be input through at least any one of a content provider server or an Internet site.

The graphic objects may be displayed together with a predetermined message, wherein the message may be at least one of contents describing events within any one of the broadcast contents or the moving picture contents or advertisement related contents.

The display unit may include: a content playing unit configured to play any one of the broadcast contents or the moving picture contents; an information detecting unit configured to detect information of any one of the played broadcast contents or moving picture contents; an adjusting unit configured to adjust the graphic objects based on the information of any one of the broadcast contents or the moving picture contents; and a graphic object display unit configured to display the adjusted graphic objects to meet the events of any one of the played broadcast contents or moving picture contents.

The adjusting unit may provide a user interface adjusting the graphic objects.

The metadata may be processed and transmitted to another reception apparatus.

In another aspect, a media content transmission method for providing augmenting media contents using graphic objects is provided. The media content transmission apparatus includes: generating any one of broadcast contents or moving picture contents; generating metadata including information representing each event of any one of the broadcast contents or the moving picture contents and graphic object related information associated with the events in some cases, the events including a specific scene, a specific situation, and a specific phenomenon of any one of the broadcast contents or the moving picture contents; and transmitting any one of the broadcast contents or the moving picture contents and the metadata to a receiving side.

The metadata may be generated from a person rather than a person providing any one of the broadcast contents or the moving picture contents or generated from a viewer viewing any one of the broadcast contents or the moving picture contents.

The transmitting may include multiplexing any one of the broadcast contents or the moving contents and the metadata so as to be transmitted in a transmission stream or a file type.

The transmitting may include transmitting the metadata by specifying a reception apparatus of the receiving side when the metadata are transmitted to the receiving side.

In another aspect, a media content transmission apparatus for providing augmenting media contents using graphic objects is provided. The media content transmission apparatus includes: a content generating unit configured to generate any one of broadcast contents or moving picture contents; a metadata generating unit configured to generate metadata including information representing each event of any one of the broadcast contents or the moving picture contents and graphic object related information associated with the events in some cases, the events including a specific scene, a specific situation, and a specific phenomenon of any one of the broadcast contents or the moving picture contents; and a transmitting unit configured to transmit any one of the broadcast contents or the moving picture contents and the metadata to a receiving side.

The transmitting unit may multiplex any one of the broadcast contents or the moving picture contents and the metadata and transmit the multiplexed contents in a transmission stream or a file type.

BRIEF DESCRIPTION OF THE DRAWINGS

FIG. 10A is a diagram for describing an appearance in which media contents and metadata of the media contents transmission method according to another exemplary embodiment of the present invention are multiplexed and the multiplexed media contents and metadata are transmitted in a transmission stream type.

DESCRIPTION OF EXEMPLARY EMBODIMENTS

Figure 1:
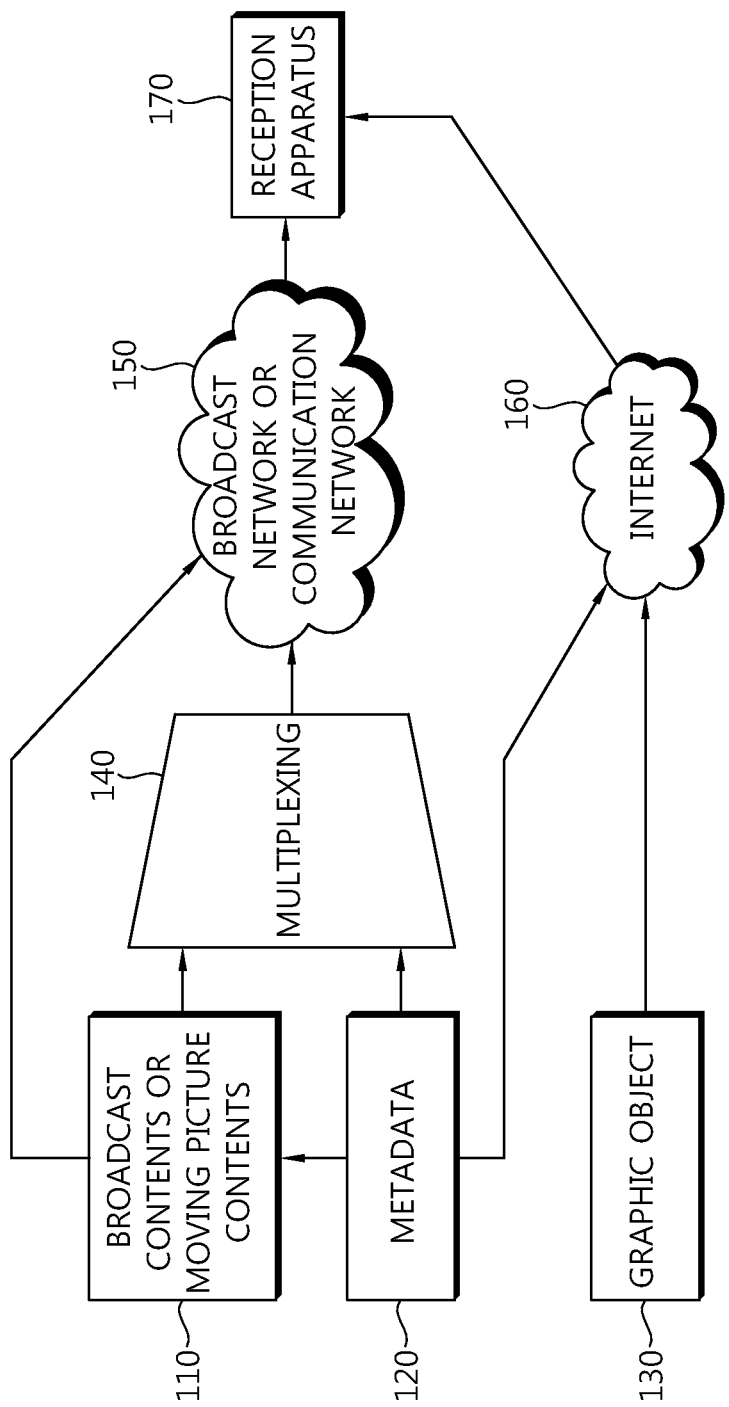
FIG. 1 is a diagram for describing a media content reception method for providing augmenting media contents using graphic objects according to an exemplary embodiment of the present invention.

Since the present invention may be variously modified and have several exemplary embodiments, specific exemplary embodiments will be shown in the accompanying drawings and be described in detail.

However, it is to be understood that the present invention is not limited to the specific exemplary embodiments, but includes all modifications, equivalents, and substitutions included in the spirit and the scope of the present invention.

Terms used in the specification, 'first', 'second', etc., may be used to describe various components, but the components are not to be construed as being limited to the terms. That is, the terms are used to distinguish one component from another component. Therefore, the first component may be referred to as the second component, and the second component may be referred to as the first component. The term 'and/or' includes a combination of a plurality of items or any one of a plurality of terms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

Providing General Augmenting Broadcasting Contents

Broadcast contents, moving picture contents, or other various types of media contents that are provided from broadcast content, moving picture content, or other various types of media content providers may be classified into real-time relay contents provided through real-time relay and previous production contents that are produced and edited before being provided to viewers. An example of the real-time relay contents may include news, sports, and the like and an example of the previous production contents may include dramas, artistic programs, documentaries, and the like.

The broadcast content, moving picture content, or other various types of media content providers may previously prepare and provide metadata for representing or describing situations corresponding to each scene by analyzing all the contents and the related scenarios prior to providing the corresponding contents by using a metadata authoring server in case of previous production contents.

On the other hand, in case of real-time relay contents such as baseball, soccer, and the like, situations changing from moment to moment or metadata for representing or describing specific events such as 'home run', 'goal', and the like, need to be prepared and provided in real time. Throughout the present specification, the term 'event' is used as including at least any one of specific situations, specific scenes, and specific contents, within contents.

For example, there is a previously produced drama. Herein, the corresponding content provider uses the metadata authoring server to analyze drama contents and scenarios, thereby extracting specific situations such as a kiss scene, a crying scene, and the like, that are represented in the drama, preparing metadata for representing or describing the situations, and providing the prepared metadata to viewers. Even for contents relayed in real time such as baseball, soccer, and the like, the corresponding content providers may use the metadata authoring server to prepare metadata for representing or describing situations livelily happening on the spot, for example, situations as to whether a ball thrown by a pitcher is a strike or a ball in case of baseball, whether a batter makes a hit or a home run or is out, and the like and provide the prepared metadata to viewers.

Media Content Reception Method

FIG. 1 is a diagram for describing a media content reception method for providing augmenting media contents using graphic objects according to an exemplary embodiment of the present invention. As shown in FIG. 1, in the media content reception method according to the exemplary embodiment of the present invention, a reception apparatus 170 receives metadata 120 including broadcast contents or moving picture contents 110 and information regarding the broadcast contents or the moving picture contents 110 through a broadcast network or communication network 150. In this case, the broadcast contents or moving picture contents 110 and the metadata 120 may be multiplexed 140 and transmitted and each may be separated and transmitted. In addition, the metadata 120 may be transmitted through the broadcast network or communication network 150 and the Internet 160. The graphic objects are transmitted to the reception apparatus 170 through the Internet 160.

The broadcast contents or moving picture contents 110 may be the broadcast contents, the moving picture contents, or other media contents in some cases. When the broadcast contents or moving picture contents 110 are provided to the reception apparatus 170 through the broadcast network or communication network 150, the metadata 120 may be multiplexed and transmitted together with the broadcast contents or moving picture contents 110 by a multiplexer 140 (see FIG. 10A). When a scale of the metadata 120 is not large or in case of the metadata 120 related to the real-time relay contents, the metadata 120 may be multiplexed 140 together with the broadcast contents or moving picture contents 110 and transmitted, as described above.

Meanwhile, when the scale of the metadata 120 is large or when intending to transmit the specific metadata 120 to any specific person or a specific reception apparatus, the metadata 120 may be provided in an independent stream type or a data file type (see FIG. 10B) and viewers may also directly access a server for the broadcast content or moving picture content 110 provider to download necessary metadata 120. When the metadata 120 are provided in the independent stream type, the metadata may also be provided to the specific viewer terminal or the specific viewer in a unicast type and may also be provided to the specific viewer terminal group or the specific viewer group in a multicast type (see FIG. 11B). That is, in this case, the broadcast contents or moving picture contents 110 are broadcast in real time or streamed to the receiving apparatus 170 from the server like VoD. Similarly, when the content providers or the server providing contents stream the broadcast contents or moving picture contents 110, the metadata 120 are also streamed independently.

In addition, the metadata 120 may be authored and provided by a third party rather than the content providers and the viewers may directly author the metadata 120.

Further, the viewers may receive the graphic objects 130 for providing the augmented reality services through the Internet. When the graphic objects 130 are directly prepared by the content provider and uploaded on the content provider server, the viewers may access the content provider server to receive the graphic objects 130. In addition, the third party rather than the broadcast content or moving picture content provider may upload the graphic objects 130 using the Internet site and the viewer may receive the graphic objects 130 through the Internet site. Further, the viewer may directly produce the graphic objects 130 using a user interface and may also input the produced graphic objects to the reception apparatus. When the content provider does not produce the graphic objects 130, for the relationship with the metadata 120 including the graphic objects 130 related information, the graphic objects 130 may be produced according to the contents of the metadata 120 produced by the content provider. As described above, the viewer may selectively receive various graphic objects 130 produced by several methods through the Internet 160.

Figure 2:
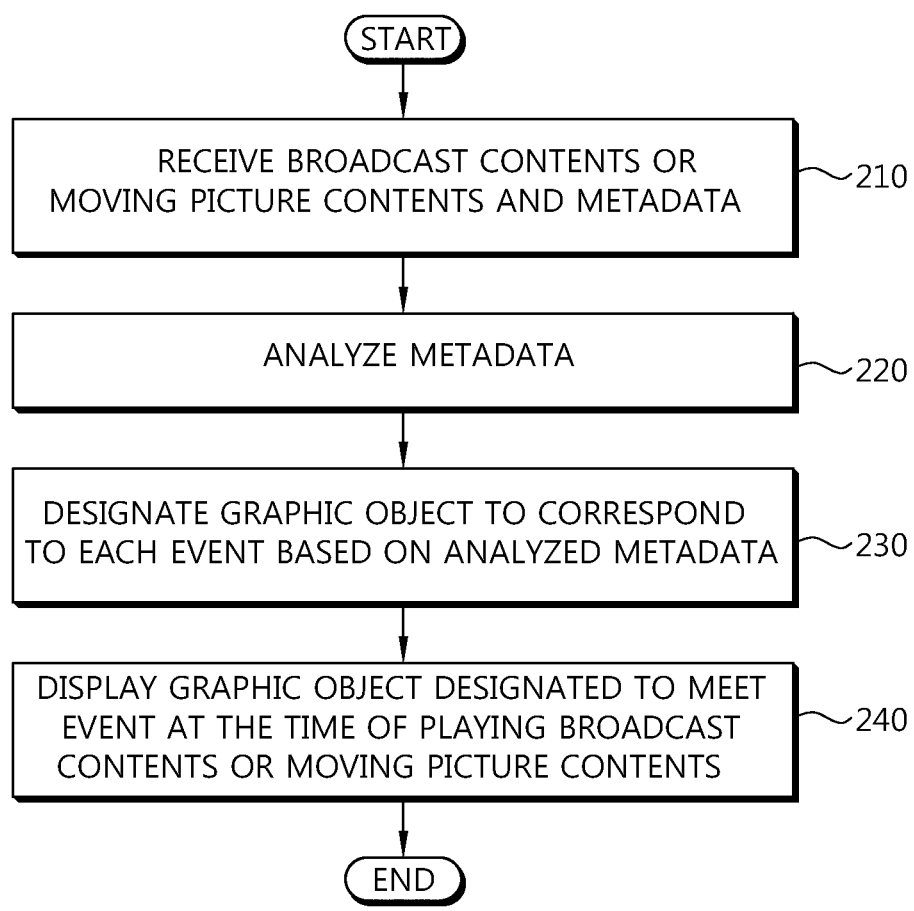
FIG. 2 is a flow chart schematically showing a media content reception method for providing augmenting media contents using graphic objects according to an exemplary embodiment of the present invention.

FIG. 2 is a flow chart schematically showing a media content reception method for providing augmenting media contents using graphic objects according to an exemplary embodiment of the present invention. As shown in FIG. 2, the media contents reception method for providing augmenting media contents using graphic objects according to the exemplary embodiment of the present invention may include receiving metadata that includes information representing the broadcast contents or the moving picture contents and each event of the broadcast contents or the moving picture contents and the graphic object related information associated with the events (210), analyzing the metadata (220), designating the graphic objects to correspond to each event based on the analyzed metadata (230), and displaying the graphic objects designated to meet the events at the time of playing the broadcast contents or the moving picture contents (250).

First, in the receiving 210, the receiving unit (not shown) receives the broadcast contents or the moving picture contents and the metadata through the broadcast network or communication network and the Internet. As described above, the broadcast contents or the moving picture contents and the metadata may be multiplexed and received and each may be separated and received. The receiving unit may receive the broadcast contents or the moving picture contents and the metadata using an antenna, a receiving card, and the like. The receiving unit may access the content provider server provided by the content provider or the metadata providing server providing the metadata to receive the metadata.

Next, in the analyzing the metadata (220), the metadata analyzing unit (not shown) analyzes the metadata received in the receiving (210). In the receiving (210), when the received metadata are multiplexed together with the broadcast contents and the moving picture contents, the broadcast contents or the moving picture contents are separated from the metadata and each are extracted, video and audio are decoded, and the metadata are analyzed. In the receiving (210), when the broadcast contents or the moving picture contents and the metadata are each separated and received without being multiplexed, the S220 does not perform the separating and extracting process. The video and audio each may be decoded and both may be decoded at the transmitting side according to the encoding type. After the decoded, the broadcast contents or the moving picture contents may be buffered for synchronization with the metadata. When the metadata are encoded at the transmitting side, the metadata are analyzed by performing decoding at the receiving side according to the encoding type. The metadata may also include positional information in which the graphic objects are stored. In addition, the metadata may include information regarding at which frame the graphic objects are displayed in connection with the events Thereafter, the graphic objects may be designated to correspond to events based on the information analyzing the metadata. In this case, since the synchronization of the broadcast contents or the moving picture contents and the analysis of the metadata cannot be completed at the same time, the playing of the broadcast contents or the moving picture contents may be delayed for synchronization until the analysis of the metadata is completed. In addition, for synchronization, the metadata associated with the broadcast contents or the moving picture contents of the next program are transmitted in advance for the current broadcasting of the programs to allow the reception apparatus to easily perform the synchronization, thereby adjusting a schedule.

The graphic objects may be input by being directly prepared by the users using the user interface or may be input by being downloaded from the external apparatus. The users directly use program tools to produce the graphic objects. The produced graphic objects may be input through the user interface. In this case, the user may accurately input the desired graphic objects, but the user takes temporal and spatial efforts as many. The user uses the Internet through the external apparatus to download the graphic objects, thereby inputting the graphic objects. In this case, the graphic objects do not completely the same as the user desired graphic objects, but input the graphic objects only by simple download behaviors. In addition, when downloading the graphic contents directly produced by the content provider, the necessary graphic objects may be downloaded from the content provider server by detecting the position in which the graphic objects are stored, by using the metadata analyzed in the analyzing of the metadata 220. Even which the user inputs the graphic objects through the user interface or inputs the graphic objects provided by the third party rather than the content provider, the graphic object related information needs to be included in the metadata. Therefore, the user and the third party need to produce the graphic objects based on the metadata format provided by the content provider. The user may selectively input the graphic objects provided using various types.

Next, in the designating (230), the designating unit (not shown) matches the graphic objects to each event of the broadcast contents or the moving picture contents. For example, when the broadcast contents such as soccer game are played, if graphic objects associated with a 'goal' event and a 'corner kick' are input, the designating unit designates the 'goal' event of the broadcast contents or the moving picture contents corresponding to the 'goal' related graphic object and the 'corner kick' event corresponding to the 'corner kick' related graphic object of the broadcast contents or the moving picture contents. Through this, it is possible to prevent errors, such as the 'goal' related graphic object from being played, at the time of the 'corner kick' event.

Finally, in the displaying 240, the display unit (not shown) displays the designated graphic objects to meet each event included in the broadcast contents when playing the broadcast contents. The graphic objects may be overlaid on the scene of the broadcast contents or the moving picture contents at the time of displaying and the graphic objects may be displayed at a position out of the scene of the broadcast contents or the moving picture contents. The viewer may appreciate more lively broadcast contents or the moving picture contents by displaying the graphic objects.

Figure 3:
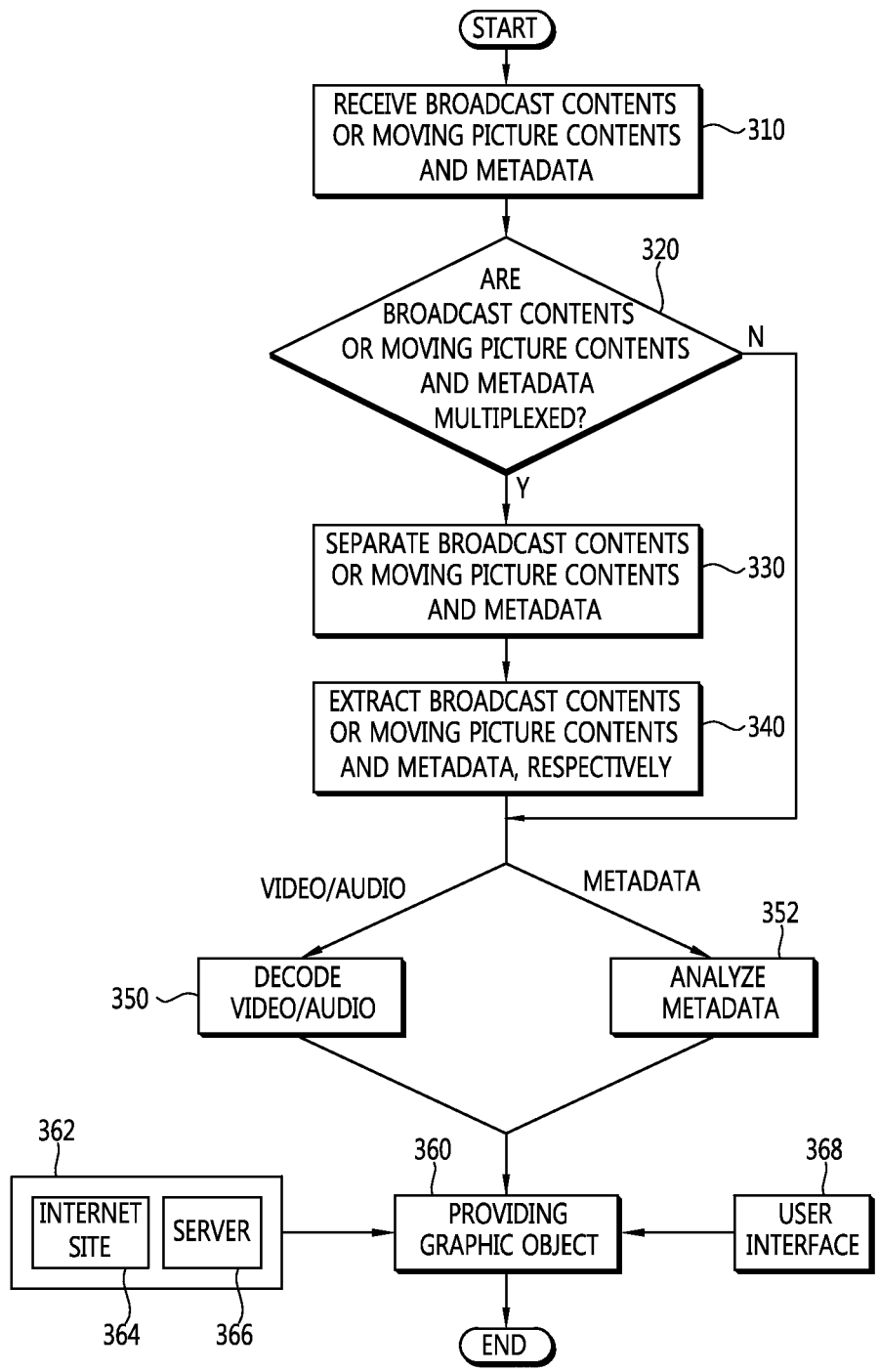
FIG. 3 is a detailed flow chart showing receiving, analyzing metadata, and inputting in a media content reception method for providing augmenting media contents using graphic objects according to an exemplary embodiment of the present invention.

FIG. 3 is a detailed flow chart showing receiving (210), analyzing the metadata (220), and inputting the graphic objects in a media content reception method for providing augmenting media contents using graphic objects according to an exemplary embodiment of the present invention.

First, the receiving unit (not shown) receives the broadcast contents or the moving picture contents and the metadata (310). Thereafter, it is determined whether the received broadcast contents or the moving picture contents and the metadata are multiplexed or received as an independent stream (320). When the broadcast contents or the moving picture contents are multiplexed to transmit the metadata, the broadcast contents or the moving picture contents are separated from the metadata (330). In addition, the separated broadcast contents or the moving picture contents and the metadata are each extracted (340). Next, the video/audio of the extracted broadcast contents or moving picture contents are decoded (350). The decoding is performed based on the encoding type at the transmitting side. In addition, the metadata are analyzed (352).

The metadata analyzed in the analyzing of the metadata (352) includes the information related to each event of the broadcast contents or the moving picture contents and several necessary information and therefore, the analyzing (352) may become a key part in the media content reception method for providing the augmenting media contents using the graphic objects of the present invention. Describing in detail the metadata, the metadata may include program information, time information, and frame information corresponding to the specific scene so as to display the graphic objects on a screen only in the specific scene of the specific program. When authoring the metadata at the time of the transmitting side, there is a need to generate the metadata in consideration of the information. In addition, the metadata may include the information as to how the behavior or phenomenon of the graphic objects is displayed on the screen of the receiving side. That is, information related to behavior such as "laugh", "jump", "turn", and the like, or information related to phenomena such as "it's raining", "lightning flashes", "sway", and the like, may be included so as to meet the events of the broadcast contents or the moving picture contents.

In addition, the metadata may include the working information of the camera used to produce the broadcast contents or the moving picture contents, that is, the camera related information such as the zoom, tilting, rolling, and the like, of the camera. The receiving side reflects the walking information of the camera to adjust the size of the graphic object, rotate the graphic object, or adjust the position at which the graphic objects are output from the display screen. This will be described in detail the displaying. Herein, the rotating of the graphic objects means the change in the three-dimensional type by changing a portion, an appearance, and the like, to be displayed, according to the vertical and horizontal rotating angle.

In addition, the metadata may include color or brightness information on each scene of the broadcast contents or the moving picture contents. The receiving side reflects the color or brightness information to adjust the color and the brightness of the graphic objects. Hereafter, this will be described in detail the displaying (240).

When the video/audio decoding (350) and the analyzing (352) of the metadata are completed, there is a need to input the graphic objects that are used for each event of the broadcast contents or the moving picture contents (360). The graphic objects may input by being downloaded from the external apparatus 362 and may also input by receiving the graphic objects directly produced by the user through a user interface 368. Upon being downloaded from the external apparatus 362, the input unit may download necessary graphic objects through an internet portal site 364 and accesses a server 366 provided by the content provider to go to a location designated by the analyzed metadata and download the graphic objects prepared by the content provider.

In the next displaying, the graphic objects are a core component of the present invention that may display the broadcast contents or the moving picture contents together. Therefore, the graphic objects will be described in more detail.

The graphic objects may perform any behavior on a display screen of various types of receiving devices such as a TV, a set top box, a DVD player, a PC, a notebook, a tablet PC, a PDA, a smart phone, and the like, and livelily represents phenomenon. Behaviors on the screen may include person's behaviors such as having specific expressions, representing feelings such as crying, laughing, and the like, representing walking, running, and the like, making a sound, and the like, but is not limited thereto. Further, a phenomenon on the screen may include a natural phenomenon such as it's raining, lightning flashes, a question mark is floating, an airplane or a bird is flying, and the like, an abstractive phenomenon, a motion of animals and plants, a motion of artificial structures, and the like, but is not limited thereto.

The graphic objects are produced by computer graphics and may also be represented in a two-dimensional type and a three-dimensional type.

The graphic objects may include elements for transferring special messages or advertisements. For example, when the graphic objects are a three-dimensional character, the graphic objects may be products of a specific company marked on wearing clothes or shoes or holding articles or products representing a specific company design as they are. In addition, situations about the scene of the broadcast contents or the moving picture contents are described using an effect such as a speech bubble beside the graphic objects or message of contents publicizing products of a specific company may be represented. In addition, situations about the scene of the broadcast contents or the moving picture contents are described using an effect such as a speech bubble beside the graphic objects or message of contents publicizing products of a specific company may be represented.

In order to represent special situations such as sports, the graphic objects include elements to more clearly understand situations of the corresponding sports. That is, characters for representing sports players wear a sports wear related to the corresponding player, represent ground environment related to the sports, sends messages in writing to represent specific situations such as 'homerun', 'hit', and the like.

In order to display various types of graphic objects on a screen of a viewer terminal, the graphic objects need to be produced in any package type. When the broadcast contents or the moving picture contents are output from the screen of the receiving side, the package may include all the behaviors or phenomena represented by the graphic objects corresponding to all the possible situations or events that can be directed and may each produced in an animation type.

In the inputting, various graphic objects may be designated by corresponding to various events only when various graphic objects are input. As a result, when the viewer appreciates the broadcast contents or the moving picture contents, various graphic objects may be appreciated together with the broadcast contents or the moving picture contents and thus, the broadcast contents or the moving picture contents may be more livelily enjoyed.

As described above, when various graphic objects are provided, each event and the graphic objects meeting the events are connected with each other by appropriately corresponding the input graphic objects to each event within the broadcast contents or the moving picture contents in the following designating (230). Through the process, it is possible to prevent the graphic objects from being crowded.

Figure 4:
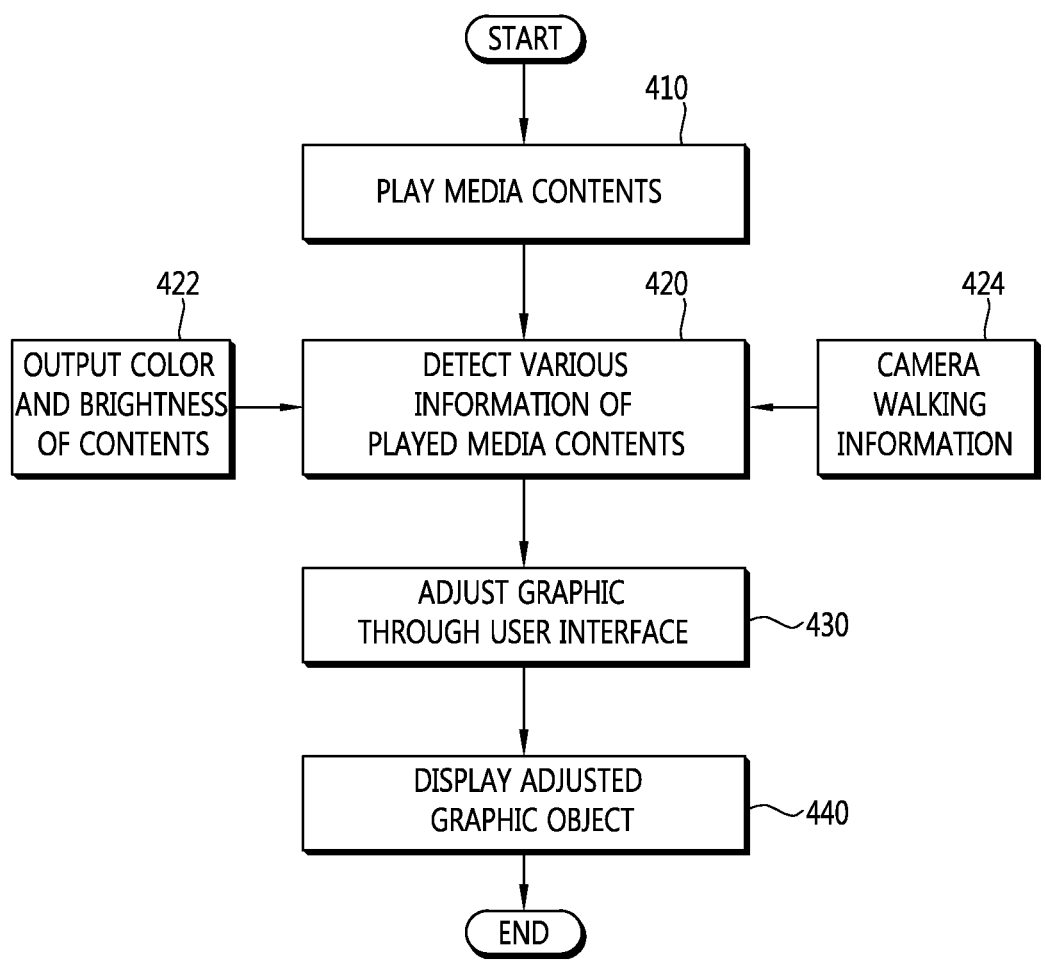
FIG. 4 is a detailed flow chart showing in detail displaying designated graphic objects in a media content reception method for providing augmenting media contents using graphic objects according to an exemplary embodiment of the present invention.

FIG. 4 is a detailed flow chart showing in detail displaying (240) in a media content reception method for providing augmenting media contents using graphic objects according to an exemplary embodiment of the present invention. As shown in FIG. 4, when the events and the graphic objects meeting the events are designated, the broadcast contents or the moving picture contents are played (410). Thereafter, various types of information on the played broadcast contents or moving picture contents are detected (420). Exemplarily, in the detecting (420), the color and brightness (422) of the broadcast contents or the moving picture contents currently played as described above and the camera walking information such as the tilting, zoom, and rolling of the camera included in the metadata can be detected. Next, it is possible to adjust the graphic objects through the user interface based on the detected information (430). Finally, the adjusted graphic objects are displayed to meet each event, together with the broadcast contents or the moving picture contents (440).

Describing in more detail the displaying (240), the receiving side terminal may select and display animation as the corresponding graphic objects according to the situations and events of the scene of the broadcast contents or the moving picture contents that are played on the display screen of the terminal by analyzing the metadata. In addition, when the graphic objects are produced as the package, the package includes a circular object and may be provided including elements capable of controlling the behavior or phenomenon of the circular objects and the user interface. Further, when the broadcast contents or the moving picture contents are output to the screen of the receiving side terminal, the package may be provided including various scenarios capable of controlling the behavior and phenomenon of the circular objects through several elements so as to direct the behavior or phenomenon of the circular objects corresponding to all the possible situations or events that can be directed. Therefore, the receiving side terminal may select the corresponding control scenario according to the situations or events the scene of the broadcast contents or the moving picture contents that are output to the display screen of the terminal by analyzing the metadata and output the behavior or phenomenon of the circular objects on the screen by being directed as scenarios.

In particular, in the adjusting (430), the display unit includes a predetermined interface to allow the graphic objects to react with a viewer adjustment of the graphic objects using the interface. For example, when the graphic objects are tickled or rotated by an apparatus having a remote controller, a keyboard, a mouse, or devices having other similar functions, the graphic objects may perform a laughing expression or a returning expression corresponding thereto.

In addition, the viewer may use a remote controller, a keyboard, a mouse, or an apparatus having other similar functions to determine whether the graphic objects are displayed on the screen of the viewer terminal. Further, the viewer desired graphic objects may be displayed regardless of the contents of the broadcast contents or the moving picture contents. In addition, the graphic objects may be set to react to the control of the viewer so that the metadata are not reflected to the behavior or phenomenon of the graphic objects.

The display screen of the receiving side terminal is provided with a hardware and software tool so as to allow the graphic objects to display various behavior or phenomenon on the screen. It is possible to overlay and display the graphic objects on the scene of the broadcast contents or the moving picture contents on the display screen of the terminal using the hardware and software. In addition, the graphic objects may be designated by the viewer in the designating but may be arbitrarily selected by the viewer terminal.

Recently, when referring to virtual advertisements provided from the TV or the Internet portal site, virtual shows that can pass around products in the three-dimensional type through a show room of a web site, the viewer needs to download the graphic object package that may represent various behaviors or phenomena in the Internet portal site. The graphic object package needs to provide the interface so as to represent the behavior or phenomenon according to the user's intention. As a result, a producer producing the graphic objects needs to give the same definition on the metadata regarding the graphic object representation on the screen of the original content provider and the screen of the viewer terminal and to produce the graphic objects having a type that can sufficiently represent the original content provider' intention and analyze it at the receiving side.

Media Content Reception Apparatus

In describing the media content reception apparatus, the overlapped portion with the description of the media content reception method is not repeatedly described.

Figure 5:
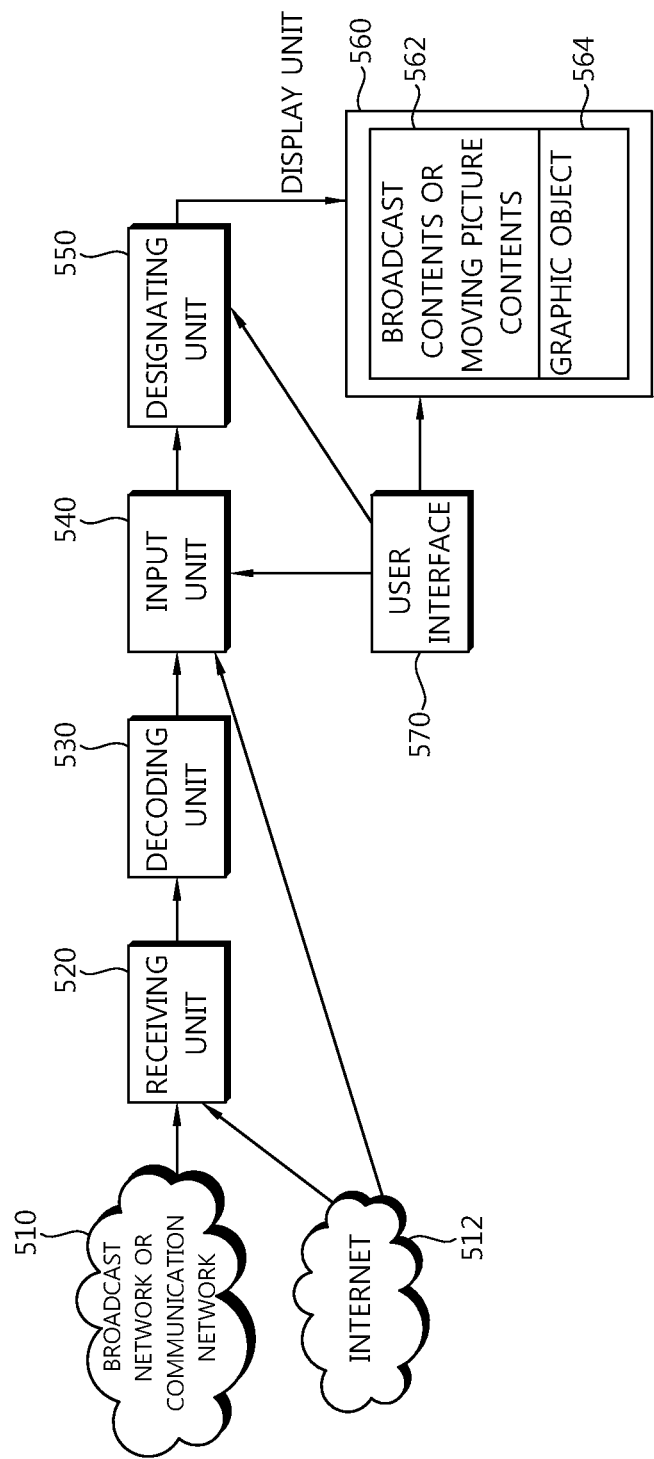
FIG. 5 is a block diagram schematically showing a media content reception apparatus for providing augmenting media contents using graphic objects according to another exemplary embodiment of the present invention.

FIG. 5 is a block diagram schematically showing a media content reception apparatus for providing augmenting media contents using graphic objects according to another exemplary embodiment of the present invention. As shown in FIG. 5, the media content reception apparatus according to the exemplary embodiment of the present invention may include a receiving unit 520, a metadata analyzing unit 530, an input unit 540, a designating unit 550, and a display unit 560.

The receiving unit 520 receives metadata that represent the broadcast contents or the moving picture contents and each event of the broadcast contents or the moving picture contents through a broadcast network or communication network 510 and an Internet network 512. The events may mean the scene, situation, and phenomenon of the broadcast contents or the moving picture contents. As described above, the broadcast contents or the moving picture contents and the metadata may be received through the broadcast network or the communication network 510 and may also receive the metadata through the Internet network 512. The broadcast contents or the moving picture contents and the metadata may be multiplexed and transmitted in a single stream and may be streamed and transmitted independently. The metadata includes the information representing each event of the broadcast contents or the moving picture contents and the graphic object related information associated with each event.

The metadata analyzing unit 530 analyzes the metadata. When the received broadcast contents and the moving picture contents and the metadata that are received through the receiving unit 520 are multiplexed, the broadcast contents or the moving picture contents are separated from the metadata and each are extracted to decode the broadcast contents or the moving picture contents and analyze the metadata. Herein, when the broadcast contents or the moving picture contents and the metadata are multiplexed and received as an independent stream rather than being received as a single stream, the separating and the extracting may be unnecessary.

The input unit 540, which is a component that inputs the graphic objects that can be displayed together at the time of playing the broadcast contents or the moving picture contents, downloads the graphic objects from the external apparatus to input the graphic objects, but may also input the graphic objects directly produced by the user through the user interface 570. When the graphic objects are downloaded from the external apparatus, the Internet network 512 may be used. In this case, the graphic objects may be downloaded by accessing the Internet portal site and may be downloaded by accessing the broadcast contents or the moving picture contents provider server. In order to variously and livelily appreciate the broadcast contents or the moving picture contents using the graphic objects, the input unit 540 needs to input a large number of various and dynamical graphic objects.

The designating unit 550 designates the graphic objects to correspond to each event within the broadcast contents or the moving picture contents. The appropriate graphic objects are present in each event and the user 570 desired graphic objects may be displayed in the specific event through the matching with the appropriate graphic objects. In this case, the user may directly designate the appropriate graphic objects in each event on the broadcast contents or the moving picture contents among the graphic objects included in the input unit 540.

When the display unit 560 plays decoded broadcast contents or moving picture contents 562 and plays the broadcast contents or moving picture contents (562), the display unit 560 displays designated graphic objects 564 to meet the events. In this case, the user may adjust the graphic objects 564 as his/her desired using the user interface 570 while viewing the broadcast contents or the moving picture contents 562 and the graphic object 564 that are played through the display unit 560. Further, the receiving terminal rather than the user may also arbitrarily select and display the graphic object 564.

Figure 6:
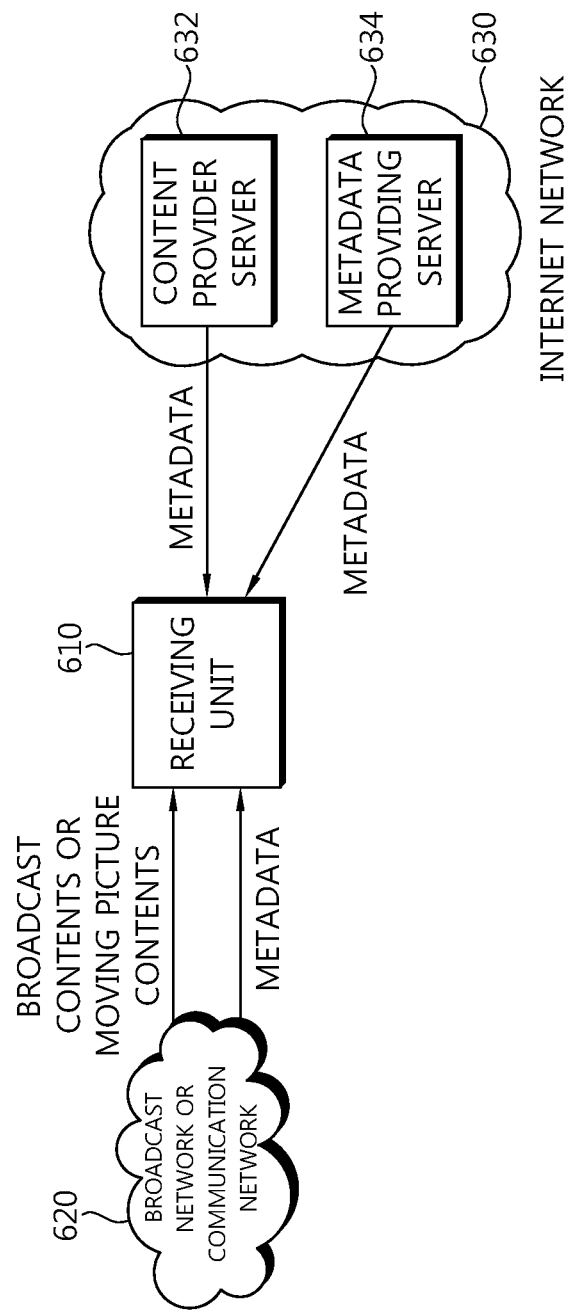
FIG. 6 is a block diagram showing in detail a receiving unit of a media content reception apparatus for providing augmenting media contents using graphic objects according to another exemplary embodiment of the present invention.

FIG. 6 is a block diagram showing in detail a receiving unit 610 of an augmenting media content reception apparatus using graphic objects according to another exemplary embodiment of the present invention. As shown in FIG. 6, the receiving unit 610 receives the broadcast contents or the moving picture contents and the metadata through a broadcast network or a communication network 620 and receives the metadata through an Internet network 630. When the metadata are received through the Internet network 630, the receiving unit 610 may receive the metadata through a server 632 of the content provider and access a metadata providing server 634 to download and receive the metadata.

Further, the input unit 540 of the media content reception apparatus according to the embodiment of the present invention may download and input necessary graphic objects through the server in which the graphic objects are stored through the metadata analyzed by the metadata analyzing unit 530 or may also download and receive the graphic objects through the Internet portal site. Further, the input unit 540 may produce the graphic objects so as to output the message together with the graphic objects. The message may be contents describing the events within the broadcast contents or the moving picture contents and the advertisement related contents.

Figure 7:
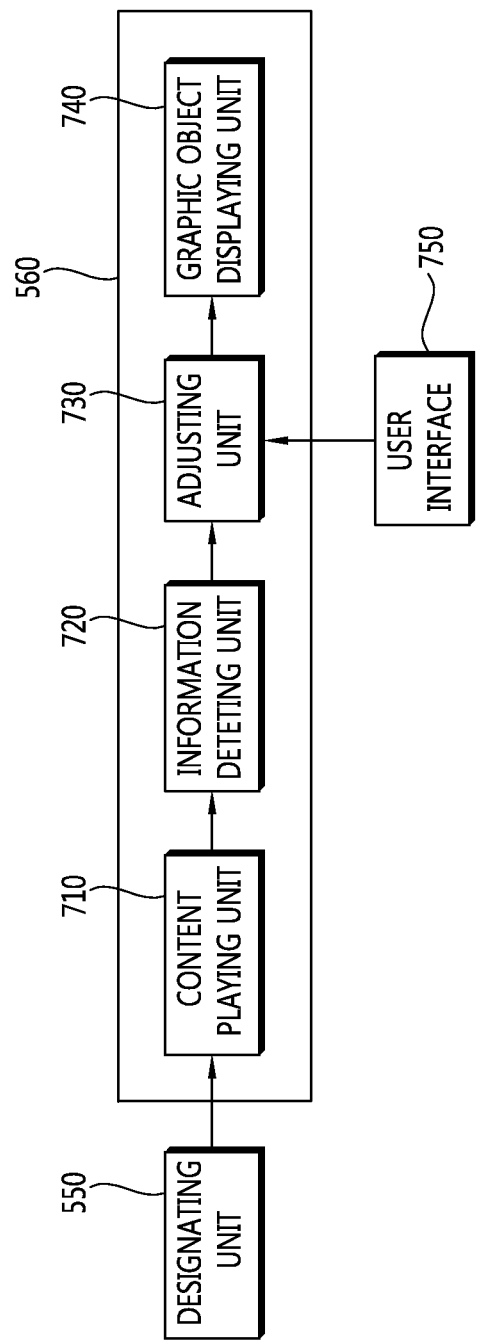
FIG. 7 is a block diagram showing in detail a display unit of a media content reception apparatus for providing augmenting media contents using graphic objects according to another exemplary embodiment of the present invention.

FIG. 7 is a block diagram showing in detail the display unit 560 of a media content reception apparatus for providing augmenting media contents using graphic objects according to another exemplary embodiment of the present invention. As shown in FIG. 7, the display unit 560 may include a content playing unit 710, an information detecting unit 720, an adjusting unit 730, and a display unit 740.

The content playing unit 710 receives the broadcast contents or the moving picture contents and each event within the broadcast contents or the moving picture contents from the designating unit 550 and receives the graphic objects corresponding thereto and receives the matching relationship. Next, the broadcast contents or the moving picture contents are played.

The information detecting unit 720 detects various information of the broadcast contents or the moving picture contents that are played by the content playing unit 710. Exemplarily, the information detected by the information detecting unit 720 may include the walking information of the camera used to produce the contents or the output color or brightness information of the played broadcast contents or moving picture contents.

The adjusting unit 730 allows a user 750 to serve to adjust the graphic objects as desired. For example, it is possible for the user to adjust a position, a size, and the like, of the graphic object through the user interface 750. In addition, the user may determine whether the graphic objects are displayed through the user interface 750. In addition, the graphic object can react to the adjusting behavior by allowing the user to adjust the graphic objects through the adjusting unit 730. Further, it is possible to adjust the size, type, and output position of the graphic objects based on the walking information of the camera used to produce the broadcast contents or the moving picture contents detected by the information detecting unit 720. In addition, it is possible to adjust the color and brightness of the graphic objects based on the output color or brightness information of the broadcast contents or the moving picture contents detected by the information detecting unit 720.

The graphic object display unit 740 displays the adjusted graphic objects to meet the events, at the time of playing the broadcast contents or the moving picture contents.

Figure 8:
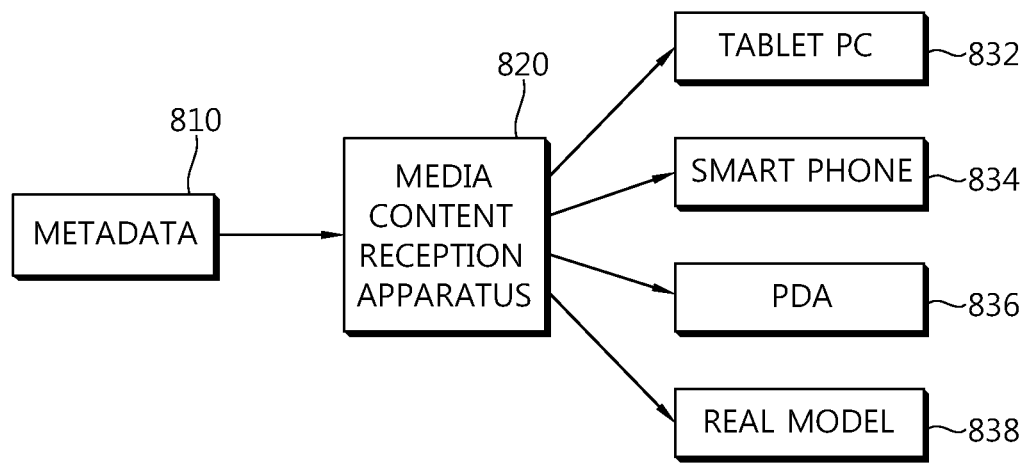
FIG. 8 is a diagram for describing a case of processing metadata by a media content reception apparatus for providing augmenting media contents using graphic objects according to another exemplary embodiment of the present invention and transmitting the processed metadata to another apparatus.

FIG. 8 is a diagram for describing the case in which metadata 810 are processed by a media content reception apparatus 820 for providing augmenting media contents using graphic objects according to another exemplary embodiment of the present invention and the processed metadata are transmitted to another apparatus. As shown in FIG. 8, the media content reception apparatus 820 according to the exemplary embodiment of the present invention may receive the metadata 810 and process the received metadata 810 and then transmit the processed metadata to another apparatus. Here, another apparatus 832 may be any one of a tablet PC 832, a smart phone 834, and a PDA 836 but is not limited thereto. This may be usefully used when the apparatus first receiving the metadata 810 is a fixed terminal such as a TV, a set top box, a DVD player, a desk top PC, and the like and the apparatus for receiving the processed metadata is a portable terminal such as the tablet PC 832, the smart phone 834, the PDA 836, and the like. In this case, the portable terminal should include components related to output so as to display the graphic objects.

When the media content reception apparatus 820 processes and transmits the metadata 810 to another apparatus, the graphic objects are displayed on the screen of the portable terminal rather than the screen of the fixed terminal according to the events included in each scene of the broadcast contents or the moving picture contents to represents the behavior or phenomenon for describing the situations. That is, in the fixed terminal, only the main contents are output on the screen of the terminal and in the portable terminal, only the graphic objects associated with the metadata for augmented reality services are displayed on the screen of the terminal.

Referring to FIG. 8, the media content reception apparatus 820 may process and transmit the metadata 810 to a real model 838. The real model 838 directly represents the behavior or phenomenon included in the processed metadata by receiving the processed metadata. Therefore, the real model 838 should be produced to represent the behavior and phenomenon. For example, when the media content reception apparatus 820 receives and processes the metadata 810 including the laughing or crying related representation and then, transmits the processed metadata to the real model 838, the real model 838 may be actually laughed and cried. In order for the real model 838 to more livelily represent the processed metadata, when the real model 838 may be produced to take behaviors, such as representing laughing or crying, change a face expression, representing a unique behavior using the whole body, or making a sound meeting the situations.

The real model 838 may communicate the media contents reception apparatus 820 in a wired or wireless way. In this case, the media content reception apparatus 820 processes the metadata 810 and transmit the processed metadata to the real model 838 in a wired or wireless type.

As described above, similar to representing the behavior or phenomenon meeting the situations by displaying the graphic objects on the screen of the media content reception apparatus 820 according to the events of the broadcast contents or the moving picture contents, the real model 838 performs any behaviors or represent a phenomenon based on the metadata, thereby providing another type of augmented reality service to viewers.

Media Content Transmission Method

Figure 9:
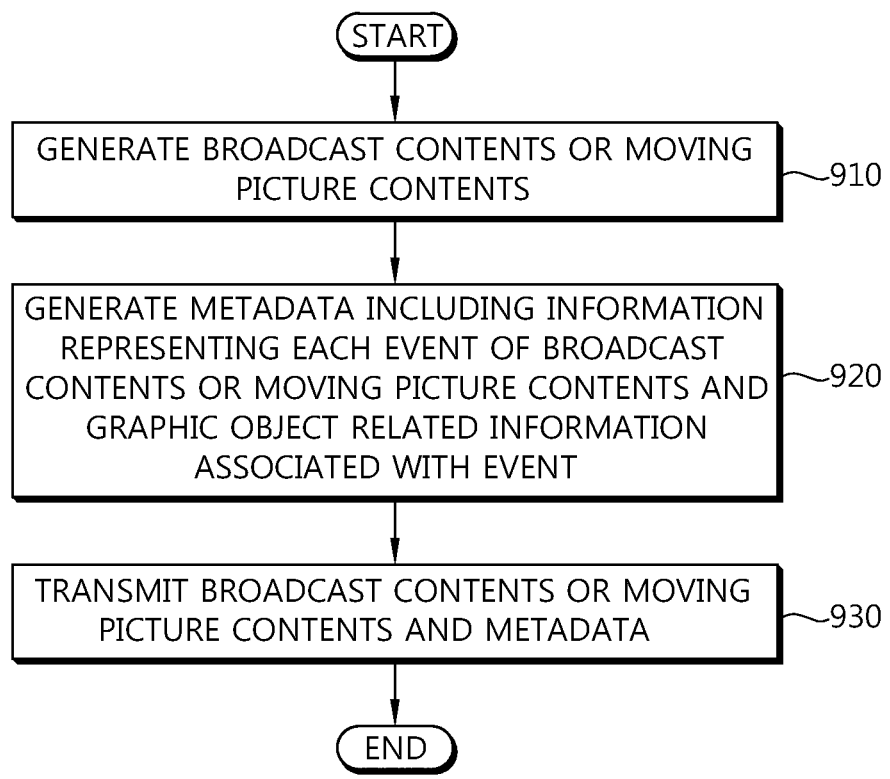
FIG. 9 is a flow chart schematically showing a media content transmission method for providing augmenting media contents using graphic objects according to another exemplary embodiment of the present invention.

FIG. 9 is a flow chart schematically showing a media content transmission method for providing augmenting media contents using graphic contents according to another exemplary embodiment of the present invention. As shown in FIG. 9, the media content transmission method according to the exemplary embodiment of the present invention may include generating broadcast contents or moving picture contents (910), generating the metadata including information representing each event of broadcast contents or moving picture contents and graphic object related information associated with each event in some cases (920), and transmitting the broadcast contents or the moving picture contents and the metadata to the receiving side (930).

First, in the generating of the contents (910), the content generating unit (not shown) generates the broadcast contents or the moving picture contents. The broadcast contents or the moving picture contents may be the broadcast contents, the moving picture contents, or other various media contents in some cases.

Next, in the generating of the metadata (920), the metadata generating unit (not shown) generates the metadata that includes the information representing the events representing at least one of the specific scene of the broadcast contents or the moving picture contents, the specific situation, and the specific phenomenon that are generated in the generating of the contents (910). In addition, the metadata may include the graphic object related information associated with each event in some cases. That is, when the content provider directly generates the graphic objects, the graphic object related information may be inserted into the metadata that are generated by the content provider. When the content provider does not directly generate the graphic objects, the graphic object related information may not be inserted into the metadata. When the graphic objects are not directly produced by the content provider, the graphic object related information may be generated by a third party or a viewer. That is, the metadata are not generated only by the content provider. The metadata may be generated by a third party rather than the content provider or the metadata may directly be generated by a viewer viewing the broadcast contents or the moving picture contents.

As described above, the content transmission apparatus (not shown) may directly generate the graphic objects used for each event in some cases. In this case, the graphic objects may be produced to be appropriate to livelily represent each event of the broadcast contents or the moving picture contents. When the content transmission apparatus generates the graphic object, the content transmission apparatus stores the predetermined server such as the content provider server without directly transmitting the graphic objects to the receiving side. The receiving side accesses the server to download the stored content objects, thereby acquiring the graphic objects.

Finally, in the transmitting (930), the transmitting unit (not shown) transmits the broadcast contents or the moving picture contents and the metadata to the receiving side.

FIG. 10A is a diagram for describing an appearance in which the broadcast contents and the metadata of the media contents transmission method according to another exemplary embodiment of the present invention are multiplexed and are transmitted in a transmission stream type. As shown in FIG. 10A, according to the media content transmission method, the broadcast contents and the metadata are multiplexed (1050) and may be transmitted in a transmission stream and a file type.

Describing in detail, the transmission apparatus may include various channels. For example, channel 1 1010 may be a movie channel, channel 2 1020 may be a sports channel, and channel N 1030 may be a news channel. In the case of channel 1 1010 that is a movie channel, the channel 1 1010 may be configured of broadcast contents 1010-1 of the movie and metadata 1010-2 associated with the movie, which may be multiplexed together (1040). As another example, the sports channel 1020 or the news channel 1030, and the like, are configured in the same manner. The broadcast contents 1010-1, 1020-1, and 1030-1 for each channel may be each encoded. Meanwhile, the information regarding each channel or all the transmission channels may be additionally provided as the information regarding a data table. The information of each channel is multiplexed 1040, 1042, and 1044 for each channel and is entirely multiplexed 1050 and is provided in the transmission stream type 1060. Alternatively, the information may also be provided in a file type. The augmenting broadcasting contents to which the present invention is applied may be include in the metadata areas 1010-2, 1020-2, and 1030-2 of each channel.

Figure 10B:
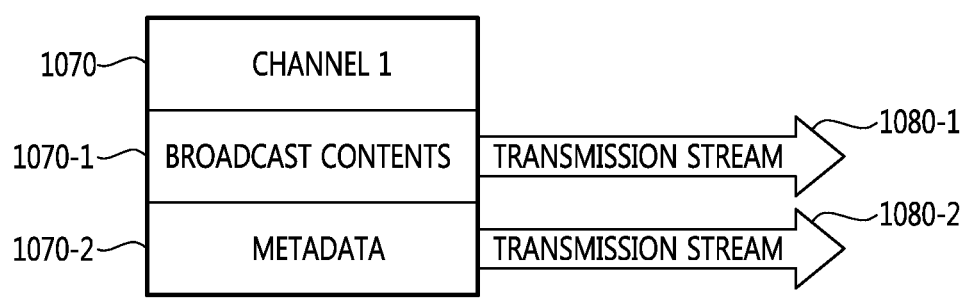
FIG. 10B is a diagram for describing an appearance in which media contents and metadata of the media contents transmission method according to another exemplary embodiment of the present invention are transmitted in an independent stream type.

FIG. 10B is a diagram for describing an appearance in which the broadcast contents and the metadata of the media contents transmission method according to another exemplary embodiment of the present invention are transmitted in an independent stream type. As shown in FIG. 10B, according to the media content transmission method of the exemplary embodiment of the present invention, a broadcast content 1070-1 and metadata 1070-2 for a single channel 1070 may be each transmitted by being streamed 1080-1 and 1080-2 independently.

Figure 11A:
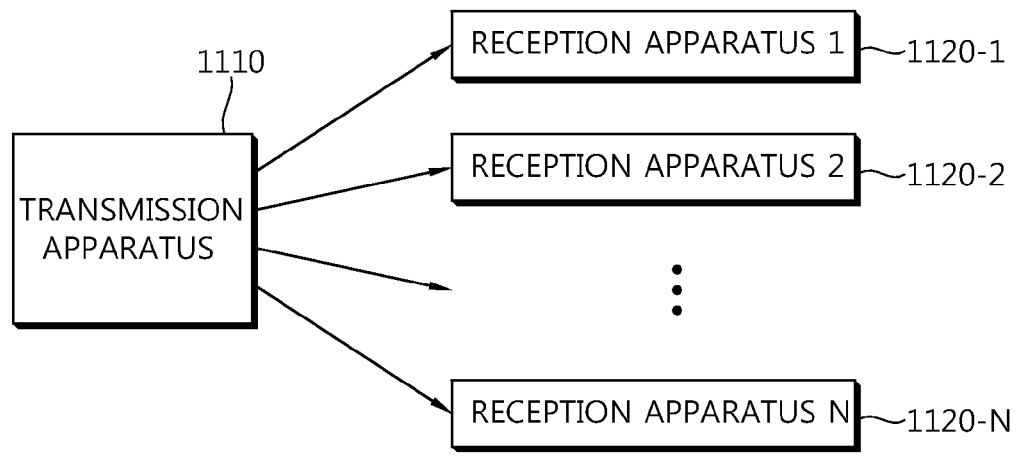
FIG. 11A is a diagram showing an appearance in which metadata are transmitted to a receiving side in a broadcast type of the media content transmission method according to another exemplary embodiment of the present invention.

FIG. 11A is a diagram showing an appearance in which metadata are transmitted to a receiving side in a broadcast type of the media content transmission method according to another exemplary embodiment of the present invention. As shown in FIG. 11A, a transmission apparatus 1110 may transmit the metadata to a plurality of reception apparatuses 1120-1, 1120-2, . . . , 1120-N in a broadcast type. All the reception apparatuses 1120-1, 1120-2, . . . , 1120-N that are in the transmission range of the transmission apparatus 1110 may receive the metadata in a type randomly transmitting the metadata.

Figure 11B:
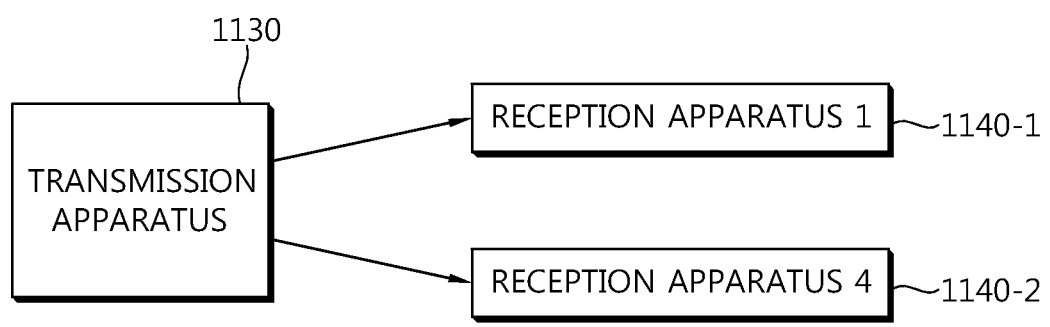
FIG. 11B is a diagram showing an appearance in which metadata are transmitted by specifying a receiving side of the media content transmission method according to another exemplary embodiment of the present invention.

FIG. 11B is a diagram showing an appearance in which metadata are transmitted by specifying a receiving side of the media content transmission method according to another exemplary embodiment of the present invention. In this case, the transmitting apparatus 1130 specifies the receiving apparatus and transmits the metadata only to a reception apparatus 1 1140-1 and a reception apparatus 4 1140-2 to be transmitted. When one or more receiving apparatus is present, the metadata are transmitted in the multicast type and when only one receiving apparatus is present, the metadata are transmitted in a unicast type.

Media Content Transmission Apparatus

Figure 12:
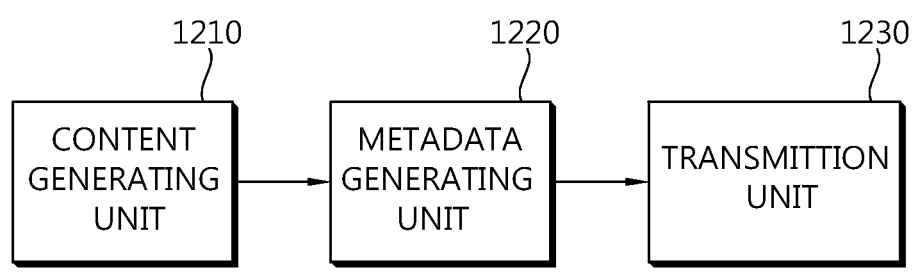
FIG. 12 is a block diagram schematically showing a media content transmission apparatus according to another exemplary embodiment of the present invention.

FIG. 12 is a block diagram schematically showing a media content transmission apparatus according to another exemplary embodiment of the present invention. As shown in FIG. 12, the media content transmission apparatus according to the exemplary embodiment of the present invention may include a content generating unit 1210 generating broadcast contents or moving picture contents, a metadata generating unit 1220 generating the metadata including information representing each event of broadcast contents or moving picture contents and graphic object related information associated with each event in some cases, and a transmitting unit 1240 transmitting the broadcast contents or the moving picture contents and the metadata to the receiving side. The description of each component 1210, 1220, and 1230 are the same as the contents of the media content transmission method and therefore, are not repeatedly described.

According to the media content transmission method and apparatus and the reception method and apparatus for providing the augmented media contents using the graphic objects of the embodiments of the present invention, it is possible to provide more funny elements to the broadcast or moving pictures viewers and help the viewers understand the broadcast or moving picture contents.

In addition, according to the media content transmission method and apparatus and the reception method and apparatus for providing the augmented media contents using the graphic objects of the embodiments of the present invention, it is possible to provide the new types of advertisement services by allowing the viewers to induce the graphic object purchase to activate the related industries, to induce the participation in the program production, and represent the commercialized advertisement contents through the corresponding graphic objects while the graphic objects are activated, for providing the graphic object related elements.

While the present invention has been shown and described in connection with the drawings and embodiments, it will be apparent to those skilled in the art that modifications and variations can be made without departing from the spirit and scope of the invention as defined by the appended claims. Therefore, future variations of the exemplary embodiments of the present invention will not depart from the technology of the present invention.

What is claimed is:

1. A media content reception method for providing augmenting media content using graphic objects, comprising:
    receiving metadata including information representing each event of any one of broadcast contents or moving picture contents and information for controlling and presenting graphic objects according to each event, and any one of the broadcast contents or the moving picture contents, the events including at least one of a specific scene, a specific situation, and a specific phenomenon of any one of the broadcast contents or the moving picture contents;
    analyzing the received metadata;
    designating the graphic objects to correspond to each event within any one of the broadcast contents or the moving picture contents based on the analyzed metadata; and
    displaying the designated graphic objects to meet each event at the time of playing any one of the broadcast contents or the moving picture contents
    wherein
    the graphic objects are downloaded separately from the metadata based on the analysis of the metadata, and
    wherein the designating is performable both by:
        selecting the downloaded graphic objects to correspond to each event based on the analysis of the metadata, and
        selecting the downloaded graphic objects by the user interface regardless of the metadata or unique event, and
    wherein the displaying comprises selecting a corresponding control scenario for the downloaded graphic objects according to the event of the broadcast contents or the moving pictures content when the downloaded graphic objects are selected based on the analysis of the metadata and outputting the behavior or phenomenon of the graphic objects on a screen as directed by the selected corresponding control scenario.

2. The media content reception method of claim 1, wherein the receiving comprises receiving the metadata by accessing at least one of a content provider server providing any one of the broadcast contents or the moving picture contents and a metadata providing server providing the metadata.

3. The media content reception method of claim 1, further comprising:
   inputting the graphic objects from at least any one of a user interface and an external apparatus,
   wherein when the graphic objects are input from the external apparatus, the graphic objects are input through at least any one of a content provider server or an Internet site.

4. The media content reception method of claim 1, wherein the graphic objects are displayed together with a predetermined message, the message being at least one of contents describing events within any one of the broadcast contents or the moving picture contents or advertisement related contents.

5. The media content reception method of claim 1, wherein the playing comprises adjusting a size, a type, and an output position of the graphic objects based on walking information of a camera used to produce any one of the broadcast contents or the moving picture contents, or adjusting color and brightness of the graphic objects based on output color or brightness information of any one of the broadcast contents or the moving picture contents.

6. The media content reception method of claim 1, wherein the graphic objects include advertisement related information.

7. A media content reception apparatus for providing augmenting media content using graphic objects, comprising:
   a receiving unit configured to receive metadata including information representing each event of any one of broadcast contents or moving picture contents and information for controlling and presenting graphic objects according to each event, and any one of the broadcast contents or the moving picture contents, the events including at least one of a specific scene, a specific situation, and a specific phenomenon of any one of the broadcast contents or the moving picture contents;
   a metadata analyzing unit configured to analyze the metadata;
   a designating unit configured to designate the graphic objects to correspond to each event within any one of the broadcast contents or the moving picture contents based on the analyzed metadata; and
   a display unit configured to play the designated graphic objects to meet the events at the time of playing any one of the broadcast contents or the moving picture contents
   wherein the graphic objects are downloaded separately from the metadata based on the analysis of the metadata, and
   wherein the designating unit includes a selecting unit configured to select the downloaded graphic object to correspond to each event and configured to select the downloaded graphic objects by the user interface regardless of the metadata or unique event, and
   wherein the display unit includes a module configured to select a corresponding control scenario for the downloaded graphic objects according to the event of the broadcast contents or the moving picture contents when the downloaded graphic objects are selected based on the analysis of the metadata and a module configured to output the behavior or phenomenon of the graphic objects on a screen as directed by the selected corresponding control scenario.

8. The media content reception apparatus of claim 7, wherein the receiving unit receives the metadata by accessing at least one of a content provider server providing any one of the broadcast contents or the moving picture contents and a metadata providing server providing the metadata.

9. The media content reception apparatus of claim 7, further comprising:
   an input unit configured to input the graphic objects from at least any one of a user interface and an external apparatus,
   wherein when the input unit inputs the graphic objects from the external apparatus, the graphic objects are input through at least any one of a content provider server or an Internet site.

10. The media content reception apparatus of claim 7, wherein the graphic objects are displayed together with a predetermined message, the message being at least one of contents describing events within any one of the broadcast contents or the moving picture contents or advertisement related contents.

11. The media content reception apparatus of claim 7, wherein the display unit includes:
   a content playing unit configured to play any one of the broadcast contents or the moving picture contents;
   an information detecting unit configured to detect information of any one of the played broadcast contents or moving picture contents;
   an adjusting unit configured to adjust the graphic objects based on the information of any one of the broadcast contents or the moving picture contents; and
   a graphic object display unit configured to display the adjusted graphic objects to meet the events of any one of the played broadcast contents or moving picture contents.

12. The media content reception apparatus of claim 7, wherein: the metadata are processed and transmitted to another reception apparatus.

13. A media content transmission method for providing augmenting media content using graphic objects, comprising:
   generating any one of broadcast contents or moving picture contents;
   generating metadata including information representing each event of any one of the broadcast contents or the moving picture contents, and information for controlling and presenting graphic objects according to each event, the events including a specific scene, a specific situation, and a specific phenomenon of any one of the broadcast contents or the moving picture contents; and
   transmitting any one of the broadcast contents or the moving picture contents and the metadata to a receiving side
   wherein the graphic objects are downloaded separately from the metadata at the receiving side based on the analysis of the metadata, and
   wherein the metadata includes a corresponding control scenario for the downloaded graphic objects according to the event of the broadcast contents or the moving picture contents when the receiving side selects the downloaded graphics objects based on the analysis of the metadata to output the behavior or phenomenon of the graphic objects on a screen as directed by the corresponding control scenario.

14. The media content transmission method of claim 13, wherein the metadata are generated from a person rather than a person providing any one of the broadcast contents or the moving picture contents or generated from a viewer viewing any one of the broadcast contents or the moving picture contents.

15. The media content transmission method of claim 13, wherein the transmitting comprises multiplexing any one of the broadcast contents or the moving contents and the metadata so as to be transmitted in a transmission stream or a file type.

16. The media content transmission method of claim 13, wherein the transmitting comprises transmitting the metadata by specifying a reception apparatus of the receiving side when the metadata are transmitted to the receiving side.

17. A media content transmission apparatus for providing augmenting media content using graphic objects, comprising:
  a content generating unit configured to generate any one of broadcast contents or moving picture contents;
  a metadata generating unit configured to generate metadata including information representing each event of any one of the broadcast contents or the moving picture contents and information for controlling and presenting graphic objects according to each event, the events including a specific scene, a specific situation, and a specific phenomenon of any one of the broadcast contents or the moving picture contents; and
  a transmitting unit configured to transmit any one of the broadcast contents or the moving picture contents and the metadata to a receiving side,
  wherein the graphic objects are downloaded separately from the metadata at the receiving side based on the analysis of the metadata, and
  wherein the metadata includes a corresponding control scenario for the downloaded graphic objects according to the event of the broadcast contents or the moving picture contents when the receiving side selects the downloaded graphics objects based on the analysis of the metadata to output the behavior or phenomenon of the graphic objects on a screen as directed by the corresponding control scenario.

18. The media content transmission apparatus of claim 17, wherein the transmitting unit multiplexes any one of the broadcast contents or the moving picture contents and the metadata and transmits the multiplexed contents in a transmission stream or a file type.

* * * * *